United States Patent
Kwon

(10) Patent No.: US 9,936,537 B2
(45) Date of Patent: *Apr. 3, 2018

(54) CHANNEL ACCESS MECHANISM

(71) Applicant: NEWRACOM, Inc., Irvine, CA (US)

(72) Inventor: Young Hoon Kwon, Laguna Niguel, CA (US)

(73) Assignee: NEWRACOM, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,040

(22) Filed: Apr. 18, 2016

(65) Prior Publication Data

US 2016/0234879 A1    Aug. 11, 2016

Related U.S. Application Data

(63) Continuation of application No. 14/928,386, filed on Oct. 30, 2015, now Pat. No. 9,374,821.

(60) Provisional application No. 62/157,357, filed on May 5, 2015, provisional application No. 62/083,138, filed on Nov. 21, 2014.

(51) Int. Cl.
*H04W 84/12* (2009.01)
*H04W 72/04* (2009.01)
*H04W 74/08* (2009.01)

(52) U.S. Cl.
CPC ....... *H04W 84/12* (2013.01); *H04W 72/0446* (2013.01); *H04W 74/0816* (2013.01)

(58) Field of Classification Search
CPC ............................ H04L 45/05; H04W 84/18
See application file for complete search history.

(56) References Cited

U.S. PATENT DOCUMENTS 9,155,027 B1 * 10/2015 Liu .................... H04W 74/006
9,622,262 B2 *  4/2017 Zhu .................... H04W 74/002
(Continued)

FOREIGN PATENT DOCUMENTS

WO    WO -2013/119097 A1    8/2013

OTHER PUBLICATIONS

Notice of Allowance, U.S. Appl. No. 14/928,386, dated Feb. 4, 2016.

(Continued)

*Primary Examiner* — Zhiren Qin
(74) *Attorney, Agent, or Firm* — NDWE LLP

(57) ABSTRACT

A method and system to improve backoff counter handling with relation to a clear channel assessment (CCA) process. The method and system improve a wireless medium availability by adjusting the backoff counter such that the processing of a preamble of a frame received during a backoff is taken into account. Received frames that fall between two CCA thresholds may require decoding of information in the preamble to assess whether the wireless medium is available. A portion of the preamble is decoded that identifies information utilized to determine whether the wireless medium may be considered to be busy. However, during this determination that requires the reading of the preamble of a received frame the backoff counter may be held or decremented even though the wireless medium status is unknown. The method and system provide a set of possible adjustments to the backoff counter to account for this uncertainty and the outcome of the CCA.

20 Claims, 10 Drawing Sheets

(56) References Cited

U.S. PATENT DOCUMENTS

| | | | |
|---|---|---|---|
| 2008/0192721 A1* | 8/2008 | Pernu | H04W 72/1215 370/345 |
| 2009/0207747 A1 | 8/2009 | Kim et al. | |
| 2009/0303888 A1* | 12/2009 | Ariyur | H04L 41/0816 370/252 |
| 2010/0202354 A1* | 8/2010 | Ho | G06Q 10/06 370/328 |
| 2012/0213204 A1 | 8/2012 | Noh et al. | |
| 2012/0314583 A1* | 12/2012 | Hart | H04W 74/0816 370/241 |
| 2012/0320887 A1 | 12/2012 | Chintalapudi et al. | |
| 2013/0114506 A1* | 5/2013 | Cai | H04W 4/06 370/328 |
| 2013/0155976 A1 | 6/2013 | Chen et al. | |
| 2013/0201974 A1* | 8/2013 | Merlin | H04W 74/06 370/336 |
| 2013/0231149 A1* | 9/2013 | Zhou | H04W 72/082 455/509 |
| 2014/0064101 A1* | 3/2014 | Hart | H04W 74/0808 370/241 |
| 2014/0226506 A1* | 8/2014 | Sadek | H04J 3/1694 370/252 |
| 2014/0328270 A1* | 11/2014 | Zhu | H04W 74/002 370/329 |
| 2015/0110093 A1* | 4/2015 | Asterjadhi | H04W 74/008 370/338 |
| 2015/0195849 A1* | 7/2015 | Bashar | H04W 16/14 370/330 |
| 2015/0264617 A1* | 9/2015 | Choudhury | H04W 36/30 370/332 |
| 2015/0373741 A1* | 12/2015 | Yerramalli | H04W 24/08 370/336 |
| 2016/0050691 A1* | 2/2016 | Jauh | H04W 74/0808 370/252 |
| 2016/0128099 A1* | 5/2016 | Liu | H04W 74/08 370/329 |
| 2016/0330708 A1* | 11/2016 | Seok | H04W 52/0216 |

OTHER PUBLICATIONS

Corrected Notice of Allowability, U.S. Appl. No. 14/928,386, dated Feb. 22, 2016.

PCT Invitation to Pay Additional Fees, International Application No. PCT/US2015/058422, dated Dec. 18, 2015, 2 pages.

PCT International Search Report and Written Opinion of the International Searching Authority, International Application No. PCT/US2015/058422, dated Feb. 12, 2015, 13 pages.

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

IEEE Std 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

* cited by examiner

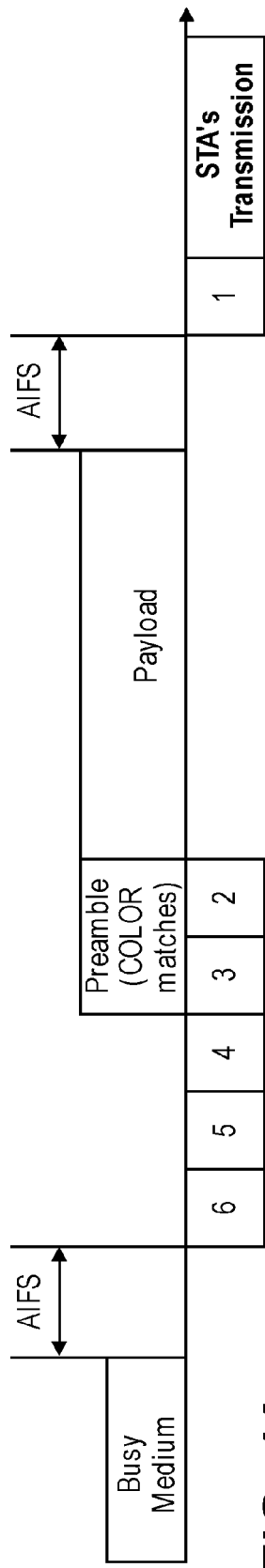
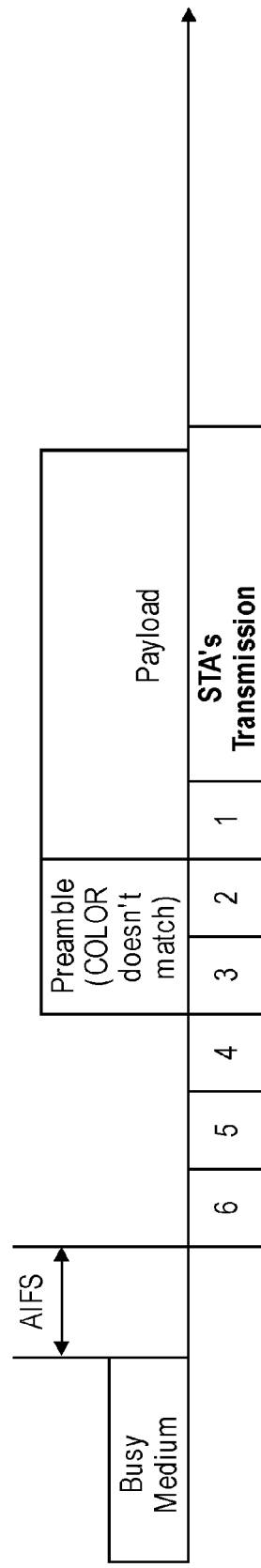
FIG. 4A
FIG. 4B

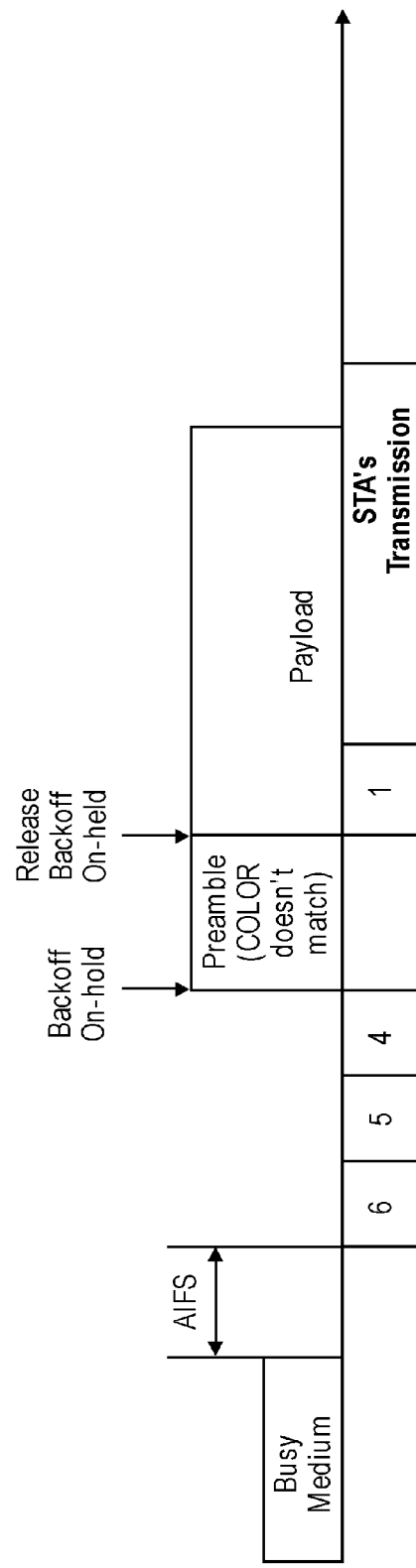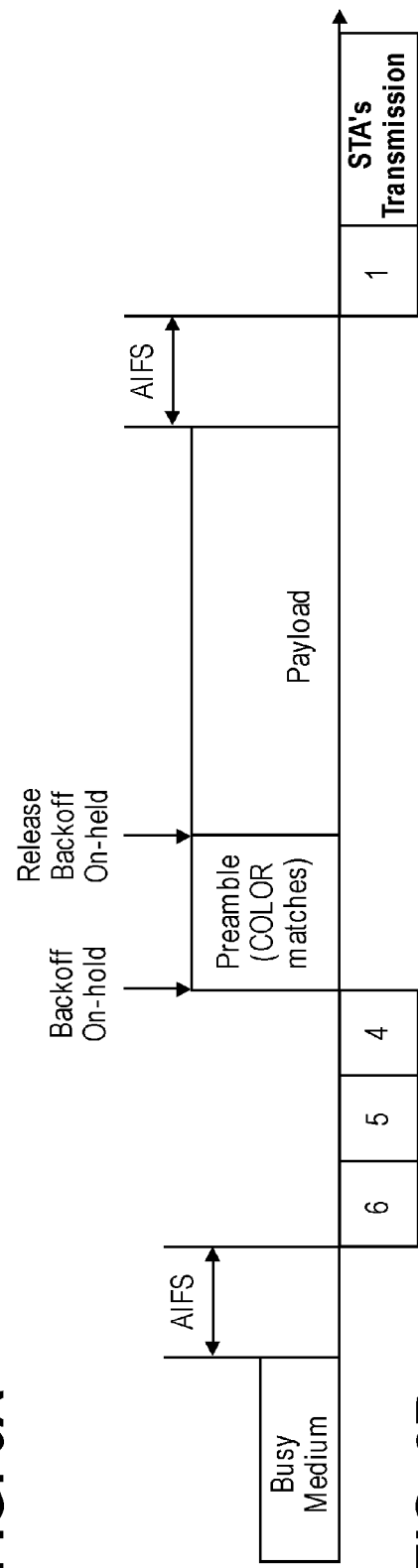
FIG. 6A
FIG. 6B

| Field | Description |
|---|---|
| L-STF | Non-HT Short Training field |
| L-LTF | Non-HT Long Training field |
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |
| Data | The Data field carries the PSDU(s) |

CHANNEL ACCESS MECHANISM

CROSS-REFERENCE TO RELATED APPLICATIONS

This application is a continuation of U.S. application Ser. No. 14/928,386, filed Oct. 30, 2015, which claims the benefit of U.S. Provisional Application No. 62/083,138, filed Nov. 21, 2014, and U.S. Provisional Application No. 62/157,357, filed May 5, 2015, which are hereby incorporated by reference.

FIELD OF INVENTION

The embodiments of the invention are related to the field of wireless local area network (WLAN) operation. More specifically, the embodiments of the invention relate to a method and system for improving the efficiency in assessing the availability of the wireless medium by improving the backoff mechanism in the clear channel access (CCA) process. Other embodiments are also disclosed.

BACKGROUND

Institute of Electrical and Electronics Engineers (IEEE) 802.11 is a set of physical and media access control (MAC) specifications for implementing wireless local area network (WLAN) communications between a set of network devices, referred to as stations, and/or access points. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

Communication, on any given channel of either the 2.4 GHz or the 5 GHz band, between network elements of the WLAN utilizes the clear channel assessment (CCA) protocol. CCA is defined in the IEEE 802.11 standard as part of the Physical Medium Dependent (PMD) and Physical Layer Convergence Protocol (PLCP) layer. Clear Channel Assessment is composed of two related functions, carrier sense (CS) and energy detection (ED). The CCA protocol is implemented in the physical layer (PHY) of a network device and determines the current state of use of the wireless medium (WM) (i.e., a 2.4 GHz or 5 GHz band), such that a network device (e.g., a station) will access a channel of the WM only when the WM becomes idle.

The conventional CCA rule mechanism defined in IEEE 802.11 defines the primary channel to be busy, if one of the conditions listed in the Table I is met, otherwise the primary channel is considered to be idle. If the primary channel is idle, the PHY will check the secondary channels.

TABLE I

| Operating Channel Width | Conditions |
|---|---|
| 20 MHz, 40 MHz, 80 MHz, 160 MHz or 80 + 80 MHz | The start of a 20 MHz NON_HT PPDU in the primary 20 MHz channel as defined in 18.3.10.6 (CCA requirements) |

TABLE I-continued

| Operating Channel Width | Conditions |
|---|---|
| 40 MHz, 80 MHz, 160 MHz or 80 + 80 MHz | The start of a 40 MHz non-HT duplicate or VHT PPDU in the primary 40 MHz channel at or above −79 dBm, The start of an HT PPDU under the conditions defined in 20.3.21.5 (CCA sensitivity) |
| 80 MHz, 160 MHz or 80 + 80 MHz | The start of an 80 MHz non-HT duplicate or VHT PPDU in the primary 80 MHz channel at or above −76 dBm |
| 60 MHz or 80 + 80 MHz | The start of a 160 MHz or 80 + 80 MHz non-HT duplicate or VHT PPDU at or above −73 dBm |

SUMMARY

The embodiments provide a method and system for wireless medium improving backoff counter handling with relation to a clear channel assessment (CCA) process. The method and system improve a wireless medium availability by adjusting the backoff counter such that the processing of a preamble of a frame received during a backoff is taken into account. The method and system adjust the backoff counter to avoid it being unnecessarily held which delays the transmission of the network device on the wireless medium. In some embodiments, a check is made whether a frame received during a backoff period has a signal quality level below a first threshold level. If the received frame has a signal quality level below the first CCA threshold level then a check is made whether the received frame is above a below a second CCA threshold level. Received frames that fall between these two CCA thresholds may require decoding of information in the preamble to assess whether the wireless medium is available. A portion of the preamble is decoded that identifies information utilized to determine whether the wireless medium may be considered to be busy. However, during this determination that requires the reading of the preamble of a received frame, the backoff counter may be held or decremented even though the wireless medium status is unknown. The embodiments provide a set of possible adjustments to the backoff counter to account for this uncertainty and the outcome of the CCA.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 4A is a diagram illustrating a first case of a second embodiment of an alternate backoff counter process.

FIG. 4B is a diagram illustrating a second case of the second embodiment of an alternate backoff counter process.

FIG. 6A is a diagram illustrating a first case of a fourth embodiment of an alternate backoff counter process.

FIG. 6B is a diagram illustrating a second case of the fourth embodiment of an alternate backoff counter process.

DETAILED DESCRIPTION

Figure 1:
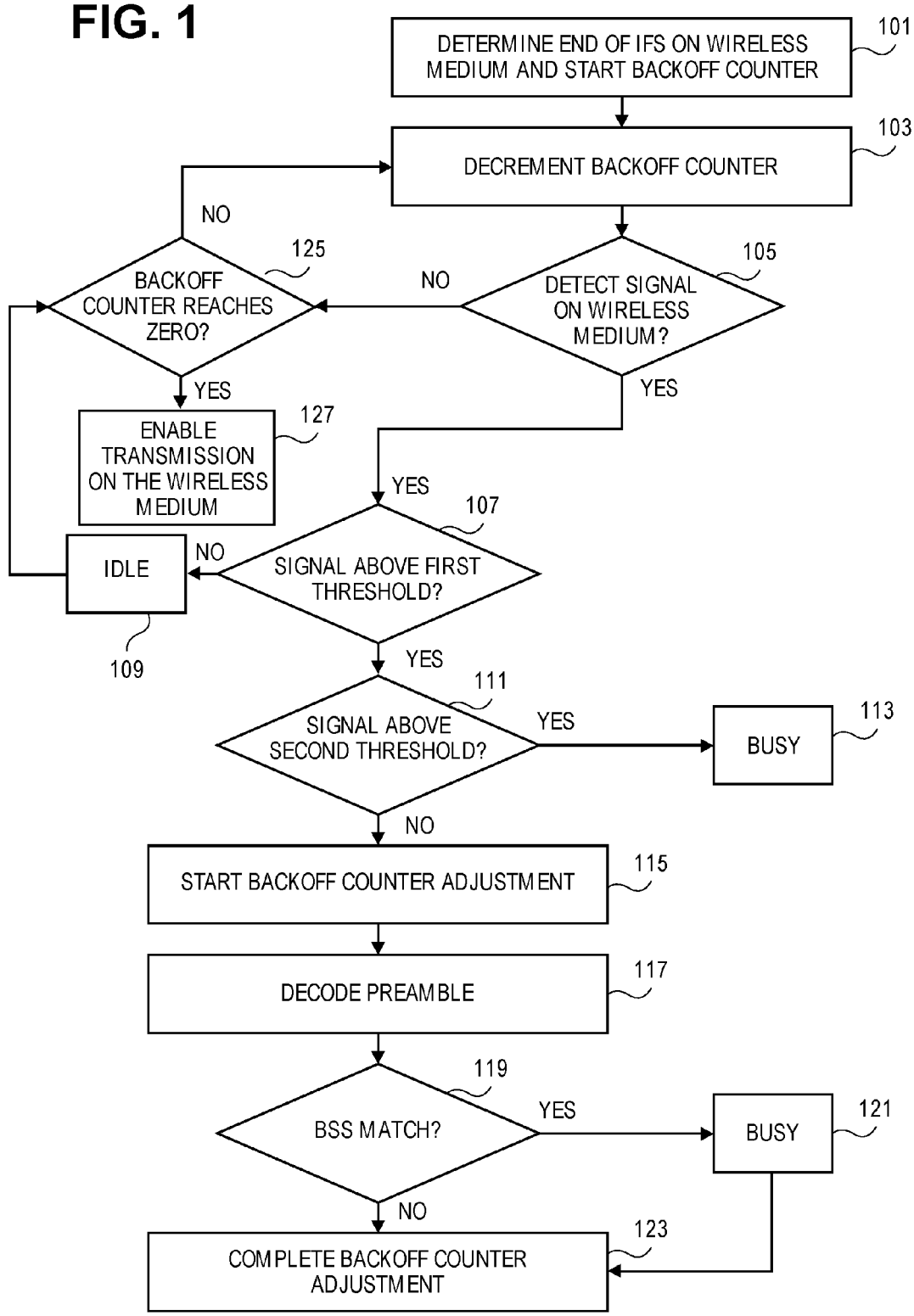
FIG. 1 is a flowchart of one embodiment of a process for adjusting a backoff counter as part of the CCA process.

The embodiments provide a method and system for wireless medium assessment for a network device in a wireless communication system such as a wireless local area network (WLAN) implementing IEEE 802.11. The method includes a method of adjusting a backoff counter to take into account increasingly complex clear channel assessment (CCA) processes that involve dynamic CCA thresholds or similar changes that increase the availability of a wireless medium. The method improves wireless medium availability by adjusting the backoff counter to account for processing of a preamble of a received frame to determine whether the wireless medium is available. With the embodiments, the backoff counter is not unnecessarily held which delays the transmission of the network device on the wireless medium. In some embodiments, a check is made whether a frame received during a backoff period has a signal quality level above a CCA first threshold level. If the received frames have a signal quality level above the first CCA threshold level then a check is made whether the received frame is above or below a second CCA threshold level, where the second CCA threshold level is higher than the first CCA threshold level. The first CCA threshold level and second threshold level can be checked in sequence or parallel. Received frames that fall between these two CCA thresholds may require decoding of information in the preamble to assess whether the wireless medium is available. For example, a portion of the preamble that identifies a basic services set (BSS) of the transmitting network device may be examined to determine whether the transmitting network device is in the same BSS as the implementing network device. In which case, the wireless medium may be considered to be busy. However, during this determination that requires the reading of the preamble of a received frame the backoff counter is held even though the wireless medium may be considered by the CCA process to be idle. As a result, the implementing network device is missing an opportunity to make use of the wireless medium in a timely manner. The embodiments overcome these disadvantages of the art by adjusting the backoff counter in certain situations. This adaptability in the use of the backoff counter in turn increases the availability of the wireless medium and thereby the throughput of the wireless communication system.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include stations and access points in wireless communications systems such as wireless local area network (WLAN). Stations are devices connected to and communicating in a WLAN including client or user devices that connect to the WLAN via access points. Access points are network devices that may be specialized wireless access points that can communicate with other network devices in the WLAN via the wireless medium or via wired connections.

The IEEE 802.11 standard has limitations in the availability of the wireless medium and there have been various efforts to utilize more aggressive mechanisms for improving wireless medium availability such as altering the CCA threshold value or utilizing more aggressive CCA thresholds under defined conditions that improve the availability of the wireless medium and thereby increase system throughput. However, altering (e.g., increasing) the CCA threshold value may result in more frequent packet collision and degradation of a Quality of Service (QoS) of the packet delivery. Especially, if a network device (e.g., a station (STA) or access point (AP)) assesses the wireless medium and a frame that occupies the wireless medium is to and/or from a network device under the same basic service set (BSS) that the network device is associated with. For example, in a case where the CCA threshold value is increased and a STA initiates a transmission to a serving AP, the transmission will not be successful because the AP is currently in the middle of transmission/reception with another STA.

In one example, to prevent such cases while still altering the CCA threshold scheme to improve wireless availability, the concept of a COLOR subfield in physical layer header (more specifically in a SIG field or more precisely the HE-SIG-A field) is proposed. The COLOR subfield indicates the BSS that the transmitter (or receiver) of the frame belongs to. The COLOR subfield may be smaller than a field that would be necessary for a full BSS to reduce the overhead in transmitting BSS information. Therefore, if COLOR information is provided in a transmitted frame, when a STA assesses the wireless medium and identifies a start of a frame, the STA can further check the COLOR subfield and identify the BSS that the transmitter (or receiver) of the frame belongs to. If the COLOR subfield matches with the COLOR of the STA's own BSS, then the STA will not initiate a transmission even if the received power level is below a CCA threshold.

In some implementations, to further improve the use of a COLOR subfield, the processes may define two CCA threshold values. In particular, a first CCA threshold (Thr1) and a second CCA threshold (Thr2) may be defined, such that the first CCA threshold value is equal to or less than the second CCA threshold value. If the received signal quality (e.g., received signal power) is lower than Thr1, the STA assesses the wireless medium to be "IDLE." In contrast, if the received signal quality is higher than Thr2, the STA assesses the wireless medium to be "BUSY." If the received signal quality is between Thr1 and Thr2, then the STA assesses the wireless medium status differently depending on the COLOR information of the received frame. Here, if the COLOR subfield matches with that of the STA, then the STA assesses the wireless medium to be "BUSY." But if the COLOR subfield does not match with that of the STA, then the STA assesses wireless medium to be "IDLE." By doing so, the STA's effective CCA threshold is increased from Thr1 to Thr2 except for the case that a frame that occupies the wireless medium belongs to the same BSS.

The example of the use of multiple CCA threshold values and the use of a COLOR subfield to distinguish between the CCA thresholds is provided by way of example and not limitation. One skilled in the art would understand that the process described herein would apply to other similar modifications to the CCA process that utilize multiple CCA threshold values that require an examination of data in a received frame. In particular, the embodiments relate to the cases where the frame is received during a backoff period. As described further herein below, a backoff is a time period that occurs after the completion of a transmission of a previous frame on a wireless medium. Typically, the backoff occurs after an interframe space (IFS), such as an arbitration IFS (AIFS). The IFS and backoff serve to ensure that sufficient time has occurred for the completion of a prior transmission and for a CCA to be performed before a wireless medium is utilized again. The backoff period can have any length or duration and is implemented using a backoff counter that starts at a particular value and counts down until it reaches zero at which time the implementing device can transmit assuming that the wireless medium is IDLE. However, the introduction of this example more complex CCA process and similar CCA processes that evaluate the content of the received frame introduce issues with the handling of the backoff counter.

Using the example of the above inspection of the COLOR subfield in the received frame, when a STA begins to assess the wireless medium, the backoff counter value may be set at 6 (or any other suitable fixed value). When the STA is in the middle of assessing the wireless medium (i.e., after the completion of a prior transmission), the wireless medium becomes "IDLE" from "BUSY." Then, the STA waits further for an AIFS time and as the wireless medium stays "IDLE" the STA starts decreasing the backoff counter after the AIFS. In some cases, the STA may receive another frame during the backoff. The backoff counter may have decreased to four ( ) at which point the STA identifies a beginning of a new frame, where the received signal quality of this new frame is between Thr1 and Thr2. With this received signal quality, the CCA decision relies on the COLOR subfield information. Thus, the STA needs to further decode the preamble of the received frame to come to a decision on the status of the wireless medium. Because the initial decision on the signal quality of the received frame is done at the start of the frame, but COLOR subfield identification is done at a later part (after decoding at least part of preamble part), it is not clear how to set the backoff counter value during this period. If the STA decreases the backoff counter during this period, but the COLOR subfield matches, this results in decreasing the backoff counter when the wireless medium is "BUSY." This is contrary to the standard use of the backoff. However, if the STA stops decreasing the backoff counter during this period and the COLOR subfield doesn't match, this results in not decreasing the backoff counter when the channel is "IDLE," which is also contrary to the standard use of the backoff. Therefore, both cases create new issues with how to handle the backoff counter during the decoding of information in the received frame to determine the status of the wireless medium. The embodiments, described herein below, provide multiple processes for addressing this issue and for providing improved use of the wireless medium by management of the backoff counter during decoding of the received frame.

FIG. 1 is a flowchart of one embodiment of a process for backoff adjustment. The embodiments provide a method and system for backoff adjustment. More specifically, a method that can calculate and adjust the backoff counter depending on received signal quality and information in the physical layer header of the received frame. In one embodiment, the process begins when a network device begins to assess a wireless medium. In particular the network device determines the end of an IFS and starts the operation of a backoff counter to track a backoff before transmitting a queued frame to be transmitted by the network device (Block 101). The network device decrements the backoff counter at any timer interval (Block 103). If the network detects the start of a frame on the wireless medium (Block 105), then the process of determining whether the backoff counter is to be adjusted begins. If no signal is detected on the wireless medium, then the process checks whether the backoff counter has reached zero (Block 125) and if not continues to decrement the backoff counter (Block 103). If the backoff counter reaches zero (Block 125), then the network device can transmit on the wireless medium (Block 127). In some embodiments, the received signal is an orthogonal frequency division multiplexing (OFDM) signal of a frame. In some embodiments, when the frame is initially detected, the wireless medium can be assessed to be either IDLE or BUSY pending a final determination.

In response to detecting a signal on the wireless medium, the network device determines a status and how to adjust a backoff counter by checking if the received frame has a signal quality that is greater than a first CCA threshold value (Block 107). If the signal quality exceeds the first CCA threshold value, then the network device assesses the wireless medium as BUSY and stops decreasing the backoff counter (Block 109). A signal quality can refer herein to any metric related to the signal including signal power (e.g., received signal strength indicator (RSSI)), noise-to-signal ratio or similar measurement of the signal quality. If the received signal quality is above than a first CCA threshold value then a check is made whether the signal quality is greater than a second CCA threshold value, where the second CCA threshold value is higher than the first CCA threshold value (Block 111). If the signal quality was not above the first CCA threshold, then the medium is assessed as being IDLE (Block 109). The process then continues to decrease the backoff counter until it reaches zero (Block 125). If the signal quality is above the second CCA threshold value, then the network device assesses the wireless medium as BUSY and maintains the current counter value until a point that the wireless medium is no longer busy (Block 113).

If the signal quality is below than the second CCA threshold (but above the first CCA threshold), then the received signal quality is in between the first CCA threshold value and the second CCA threshold value. The process is illustrated to make the comparisons of the first CCA threshold and second CCA threshold sequentially; however, one skilled in the art would appreciate that these comparisons can be combined and/or done in parallel. The network device then begins an adjustment of the backoff counter (Block 115). The method of starting the process can vary dependent on the embodiment of the process implemented. The backoff counter can continue to be decremented or can be held at its current value. After determining that the signal is below the second threshold, the backoff counter current value can be stored if it needs to be restored at a later point in the process. Once one of these initial actions is implemented the CCA assessment continues by decoding the preamble of the received frame to complete the assessment of the state of the wireless medium (Block 117). If the decoded physical layer (PHY) preamble indicates that the transmitter or receiver of the frame belongs to the same BSS as the network device (Block 119), then the CCA assessment determines that the wireless medium is BUSY (Block 121). If the BSS of the received frame does not match the BSS of the network device then the CCA assessment completes the backoff counter adjustment (Block 123). The decoding of the preamble may not directly lead to obtaining a full BSS, instead a shortened representation or similar identifier, such a COLOR subfield, may be present in the preamble to identify the BSS associated with the frame. In other embodiments, other data related to the determination of the evaluation of the availability of the wireless medium can be encoded in the preamble and handled with regard to the backoff adjustment in the same manner. The completion of the adjusted backoff counter process is dependent on the overall backoff counter adjustment process and can include actions that are dependent on the BSS or a similar data match. The actions can include holding a decrementing of the backoff counter until completion of the transmission of the frame, the payload of the frame, the frame and an IFS, the preamble or similar delay. The actions can include a continued decrementing of the backoff counter, or can include a fixed value decrement such as subtracting a fixed value that roughly represents the delay in processing the preamble information. Other actions can include restoring a save backoff counter value. The complete examples and variations on the actions taken during the start and completion of the adjusted back off counter process are described herein below with relation to FIGS. 2-6B.

In some embodiments, the process described with regard to FIG. 1 utilizes a combination of a CCA threshold and an overlapping BSS (OBSS) threshold. In this embodiment, the second CCA threshold is an OBSS threshold (e.g., OBSS_PD threshold value). In this embodiment, the process detects that a power level of the received frame is above a CCA threshold and below OBSS threshold, where the OBSS threshold represents a threshold value of the amount of interference from an OBSS STA that a receiving STA considers the wireless channel to be BUSY. The process then determines, based on the decoded preamble that the BSS of the transmitter of the received frame is from an OBSS in relation to a BSS of the network device. In response to determining that the BSS of the transmitter of the frame is an OBSS in relation to the BSS of the network device, the process indicates that the wireless medium is idle. Where the BSS of the transmitter of the received frame is the same or is likely the same as a BSS of the network device (i.e., the BSS is indicated in the COLOR field of the frame as a shortened identifier of the BSS identifier such that an association between COLOR value and BSS may be established, but possibly not a direct/complete match), the process indicates that the wireless medium is busy.

In this embodiment, the process decrements a random backoff counter prior to the detection of the start of the frame, where a 'random' backoff counter is a backoff counter that has a variable starting point in its count down. The process may hold the random backoff counter upon detection of the start of the frame. The COLOR field in the preamble of the frame is decoded and then decrementing the random backoff counter is resumed after the decoding of the COLOR field of the frame completes, when the COLOR field of the frame matches a COLOR field of the network device. In other embodiments, decrementing the random backoff counter after decoding the COLOR field of the frame may resume when the COLOR field of the frame is different from a COLOR field of the network device. As used herein, the backoff counters may be initiated with random values (within a range of possible values).

Figure 2:
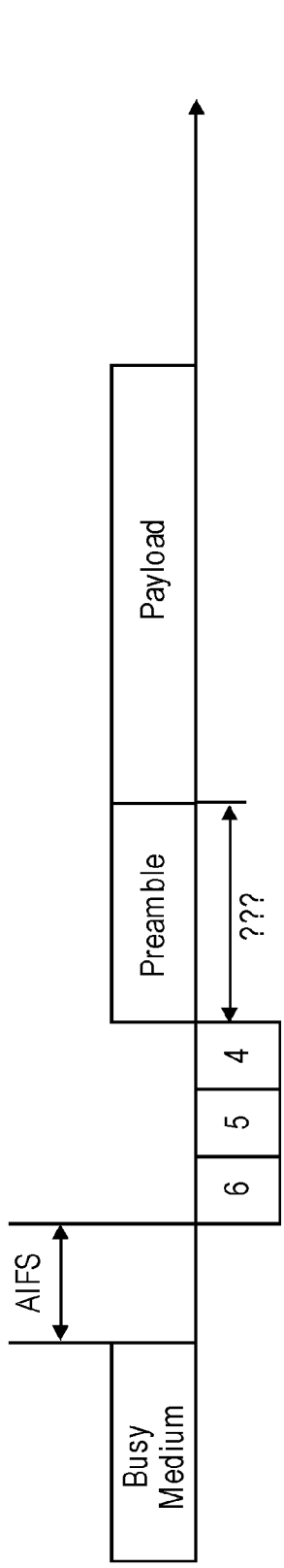
FIG. 2 is a diagram illustrating a standard CCA process including a backoff counter process.

FIG. 2 is a diagram illustrating a CCA process according to one embodiment, including a backoff counter process. The diagram illustrates the timing of signals and the backoff counter in a CCA process. After the wireless medium becomes free, an AIFS is observed before starting a backoff counter that will determine when the implementing network device can begin transmission. It is assumed in these embodiments and in this example that the network device has a frame queued to transmit and thus is monitoring the wireless medium using the CCA process to determine when the frame can be transmitted on the wireless medium.

After the AIFS completes, the network device initializes the backoff counter at a configured value. In this example, the value of the backoff counter is 6 and it begins decrementing. If it reached a value of 0, then the network device could transmit on the wireless medium. However, the other embodiments described herein provide a system and process for handling adjusting the backoff counter in cases where there is another signal detected on the wireless medium. As discussed herein above, more complex CCA processes may involve multiple CCA thresholds and require the decoding of some of the preamble of received frames to complete a determination of the state of the wireless medium. This leaves the question of how to handle the backoff counter during the time when the preamble is being received and processed.

Figure 3A:
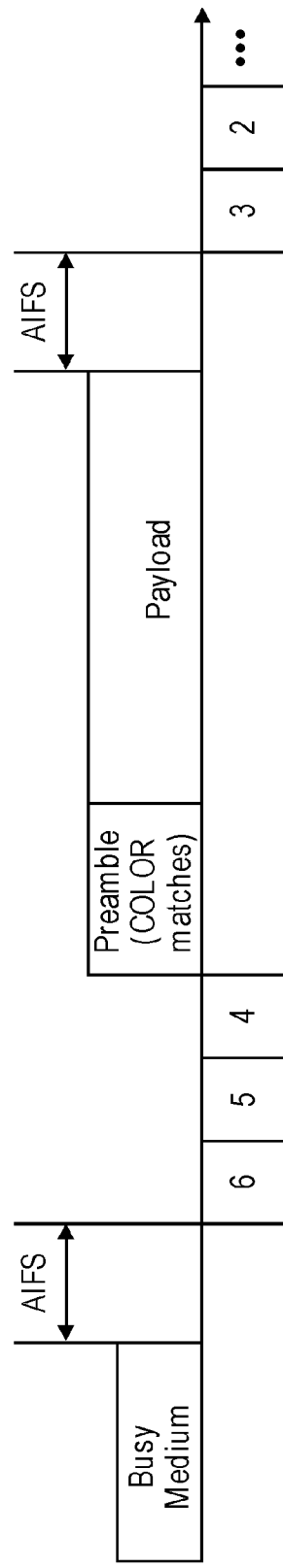
FIG. 3A is a diagram illustrating a first case of a first embodiment of an alternate backoff counter process.

FIG. 3A is a diagram illustrating a first embodiment of an alternate backoff counter process. Similar to the previous example of FIG. 2, in this example when a network device begins to assess the wireless medium, the backoff counter value is set at 6. However, one skilled in the art would understand that any value could be utilized consistent with the CCA process timing. When the wireless medium becomes IDLE, the network device waits for a predetermined interframe space (IFS) time (in this example AIFS). While the wireless medium remains IDLE, the network decreases the backoff counter value after the end of the AIFS time. In this example, when the backoff counter reaches 3, the network device identifies a beginning of a new frame, wherein the received power of this new frame is between the first CCA threshold value and the second CCA threshold value.

In this embodiment, when the received signal quality is between the first CCA threshold and the second CCA threshold values, the network device assesses the wireless medium as BUSY and stops decreasing the backoff counter, at least until the network device checks information in the physical layer (PHY) preamble. In this example, the relevant PHY preamble includes a COLOR subfield, wherein the COLOR subfield indicates the BSS that the transmitter of the frame belong to, and the COLOR subfield matches or is associated with that of the BSS of the network device. Since the COLOR subfield matches, the network device keeps the wireless medium assessment status as BUSY until the end of the frame. This scenario can happen in multiple different situations, such as i) the frame is a legacy frame that does not have the COLOR subfield, or ii) the network device fails to successfully decode the physical layer preamble.

Figure 3B:
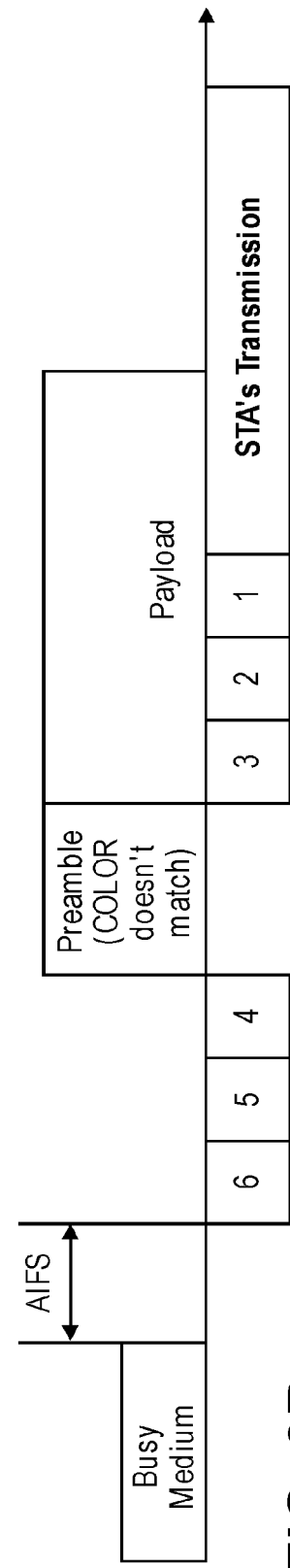
FIG. 3B is a diagram illustrating a second case of the first embodiment of an alternate backoff counter process.

FIG. 3B is a diagram illustrating a first embodiment of an alternate backoff counter process. This illustrated example is the same as that shown in FIG. 3A except that the information on the PHY preamble does not match with the COLOR (i.e., the BSS) of the network device. This scenario can happen in multiple different situations, such as the frame carries the COLOR subfield but the COLOR subfield in the frame does not match with that of the network device. Similar to the example shown in FIG. 3A, when the backoff counter was decreased to 3, the network device identifies a beginning of a new frame, wherein the received signal quality of this new frame is between the first CCA threshold value and the second CCA threshold value. As the received signal quality is between the first CCA threshold and the second CCA threshold values, the network device assesses the wireless medium as BUSY and stops decreasing the backoff counter at least until the network device checks the information in the PHY preamble. In this case, the COLOR subfield information doesn't match the BSS of the network device, then the network device changes the wireless medium assessment status to IDLE and resumes decreasing the backoff counter. When the backoff counter expires, the network device initiates its own transmission.

FIG. 4A is a diagram illustrating an example of the second embodiment of an alternate backoff counter process. Similar to the previous example of the first embodiment shown in FIG. 3A, in this example when a network device begins to assess the wireless medium, the backoff counter value is set at 6. When the wireless medium becomes IDLE, the network device waits for a predetermined IFS time (in this example AIFS). While the wireless medium remains IDLE, the network device starts decreasing the backoff counter value after AIFS time. When the backoff counter is decreased to 3, in this example, the network device identifies a beginning of a new frame, wherein the signal quality of this new frame is between the first CCA threshold value and the second CCA threshold value. As the received signal quality is between the first CCA threshold and the second CCA threshold values, the network device assesses the wireless medium to be IDLE and continues decreasing the backoff counter at least until the network device checks the PHY preamble. In this example, the PHY preamble includes a COLOR subfield, wherein the COLOR subfield indicates the BSS that the transmitter or receiver of the frame belong to, and using this information it can be determined whether the COLOR subfield matches with that of the network device. If the COLOR subfield matches the BSS of the network device, then the network device changes the wireless medium assessment status to BUSY and stops decreasing the backoff counter until the end of the frame. After the end of the transmission of the frame and the subsequent IFS the backoff counter resumes decreasing.

FIG. 4B is a diagram illustrating the second embodiment of an alternate backoff counter process. In the illustration of FIG. 4B, the case where the COLOR subfield does not match the BSS of the implementing network device. Where the received frame has a signal quality that is in between the first CCA threshold value and the second CCA threshold value, then the network device assesses the wireless medium as IDLE and continues decreasing the backoff counter until it decodes the PHY preamble of the frame. If the decoded PHY preamble indicates that the transmitter of the frame belongs to a different BSS than the network device, the network device continues to consider the wireless medium assessment status to be IDLE and continues decreasing the backoff counter. This embodiment (FIGS. 4A and 4B) is more aggressive than the first embodiment (FIGS. 3A and 3B), but increases collision possibilities.

Figure 5A:
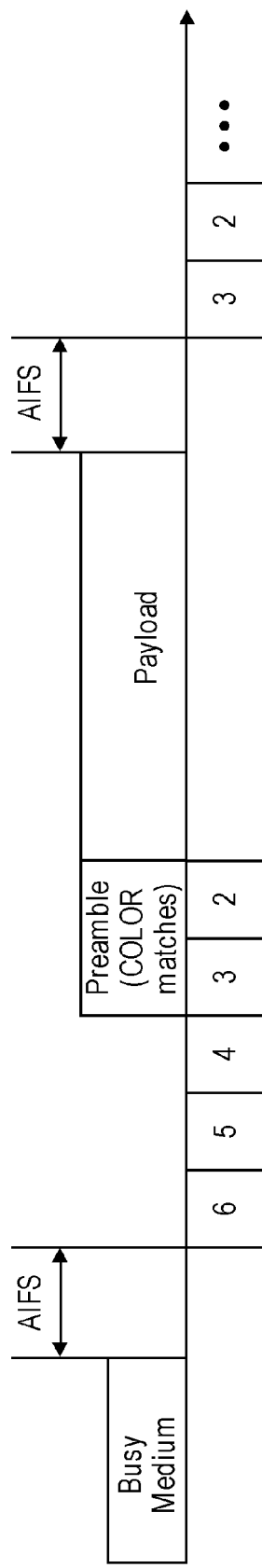
FIG. 5A is a diagram illustrating a first case of a third embodiment of an alternate backoff counter process.

FIG. 5A is a diagram illustrating a third embodiment of an alternate backoff counter process. In the third embodiment, the CCA process progresses largely the same as with the first two embodiments (FIGS. 3A and 3B and FIGS. 4A and 4B, respectively), however, if the signal quality of the received signal is in between the first CCA threshold value and the second CCA threshold value, the network device assesses the wireless medium as IDLE and continues decreasing the backoff counter until it decodes the PHY preamble. If the decoded physical layer preamble indicates that the transmitter or receiver of the frame belongs to the same BSS as the implementing network device, then the network device changes the wireless medium assessment status to BUSY and stops decreasing the backoff counter and the backoff counter value is adjusted to the value at the start of the frame. Otherwise, the network device continues the wireless medium assessment status as IDLE and continues decreasing the backoff counter. In this example the PHY preamble includes a COLOR subfield, wherein the COLOR subfield indicates the BSS that the transmitter or receiver of the frame belong to, and can be used to determine whether the COLOR subfield matches with that of the network device. In this case, the COLOR subfield matches, the network device changes the wireless medium assessment status to BUSY and stops decreasing the backoff counter until the end of the frame and the backoff value is adjusted to 3 which is the value at the start of the frame. Therefore, when the network invokes the new backoff adjustment, after wireless medium becomes IDLE again, after waiting for AIFS duration, the STA decreases the backoff counter from the value of 3. Thus, in this embodiment, the value of the backoff counter may be stored at the start of the received frame, such that the value can be restored. In the example, the first value overlapping with the received frame, which could be stored to be used in case the COLOR subfield matched. This scenario can happen in multiple different situations such as i) the frame is a legacy frame that it does not have COLOR subfield, or ii) the STA fails to successfully decode the physical layer preamble.

Figure 5B:
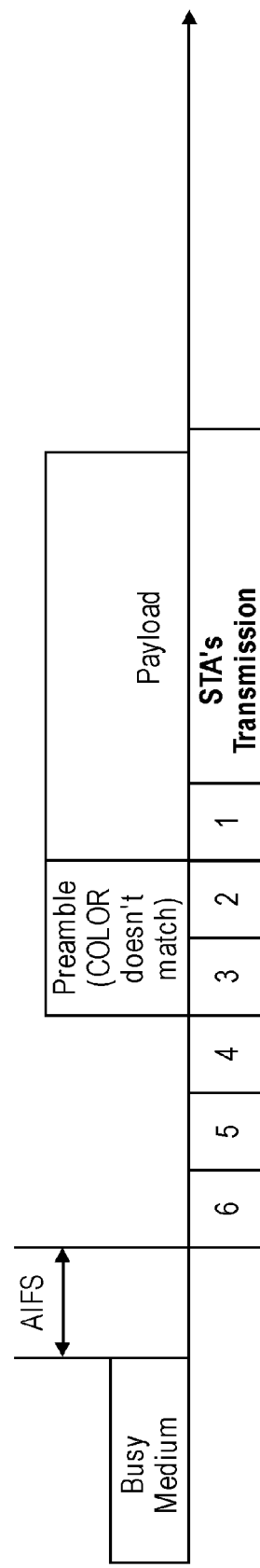
FIG. 5B is a diagram illustrating a second case of the third embodiment of an alternate backoff counter process.

FIG. 5B is a diagram illustrating the third embodiment of an alternate backoff counter process. This example is the same with the one shown in FIG. 5A except that the information on the physical layer preamble does not match with the COLOR of the STA. This scenario can happen in multiple different situations such as the frame carries COLOR subfield but the COLOR subfield in the frame does not match with that of the STA. Similar to the example shown in FIG. 6, when the backoff counter was decreased to 4, the STA identifies a beginning of a new frame, wherein the received power of this new frame is between the first CCA threshold value and the second CCA threshold value. As the received signal level is between the first and the second CCA threshold values, the STA assesses wireless medium as IDLE and continues decreasing the backoff counter at least until the STA checks follow up information in the physical layer preamble part. And as the COLOR subfield information doesn't match, the STA keeps wireless medium assessment status IDLE and continues decreasing the backoff counter. And, when the backoff counter expires, the STA initiates its own transmission.

FIGS. 6A and 6B are diagrams illustrating a fourth embodiment of an alternate backoff counter process. As the fourth embodiment can manage a backoff counter efficiently, it can have multiple benefits. The fourth embodiment encompasses a combination of some additional strategies for backoff counter adjustment that can be used in combination with aspects of the preceding embodiments. Thus, reference is also made to illustrations utilized in prior embodiments.

The fourth embodiment can handle a backoff mechanism efficiently even in a case where a frame occupying the wireless medium does not support a COLOR subfield. The benefits of the fourth embodiment further includes maintaining the backoff counter value correctly such that it can maintain fairness among multiple network devices operating in a WLAN. This embodiment, does not require any significant change from a conventional backoff mechanism, therefore implementation complexity can be minimized. The embodiment can avoid any ambiguity in backoff counter management from the start of the frame to the time the network device decodes the PHY preamble.

Throughout this fourth embodiment, CCA based on signal detection (CCA-SD) in primary channel is considered by way of example only. For those operations combined together with other mechanisms such as CCA based on energy detection (CCA-ED) or CCA based on signaling detection for wider bandwidth which includes secondary channel can be applied in combination or in place of the CCA-SD in this example embodiment. In the illustrated example, when a network device is assessing a wireless medium, if the network device detects a start of signal or frame (e.g., an OFDM frame) and if the received signal quality (e.g., sensitivity level) is above the first CCA threshold level Thr1, the network device assesses the medium as BUSY and the backoff slot boundary shall not happen before the medium becomes IDLE again. If the received signal quality is below the second CCA threshold level Thr2, wherein Thr2 is lower than Thr1, the network device assesses the medium as IDLE and the network device may decrease the backoff counter value at the next slot boundary. If the network device detects a start of a frame and if the received signal quality is between Thr1 and Thr2, then the network device may put the backoff counter on hold, which implies that a process (e.g., an Enhanced Distributed Channel Access Function (EDCAF)) that controls the backoff counter does nothing at a coming slot boundary, while CCA status is still IDLE. Then, after checking the PHY preamble that includes the COLOR subfield information, the network device (e.g., via the EDCAF) releases the backoff on hold. When the backoff on hold is released depending on the COLOR subfield information, the network may implement one of a set of different actions.

If there is an event that changes CCA status decision from the first CCA threshold status (e.g., IDLE) to the second CCA threshold status (e.g., BUSY), such that the COLOR subfield information in the received frame matches with that of the network, as the CCA becomes BUSY, the backoff counter shall not be decreased until the wireless medium becomes IDLE again. If there's no event that changes the CCA status decision, as the channel assessment remains IDLE, the process shall keep decreasing the backoff counter. If the backoff counter for that process has a nonzero value at the next slot boundary. (In some embodiments, the amount of decrement in the backoff counter value may be greater than 1 to compensate for the elapsed time for the backoff on hold duration.) The illustrated examples, a network device has a buffered data frame to send, and thus, the process of the network device initiates a transmission procedure. After the medium becomes IDLE from BUSY state, the network device waits for AIFS time to elapse for a given access category and as the medium remains IDLE during this time and further, the network device decreases backoff counter at each slot boundary. While the network device decreases the backoff counter a frame is detected, in this example, when the backoff counter value reaches at 4. The received frame is sent from a $3^{rd}$ party STA or similar source.

Referring back to FIG. 3A, this illustration can also demonstrate a case where the received signal quality (e.g., sensitivity level (P_rx)) for the frame on the medium is higher than the first threshold level (Thr1). As the received signal quality is higher than Thr1, the network device assesses the medium as being BUSY, and the backoff counter is not decreased at least at until the end of the ongoing frame. After the ongoing frame is finished and the medium becomes IDLE, and assuming the STA decoded the payload of the ongoing frame correctly, the STA will start to decrease the backoff counter after waiting for another AIFS time.

In reference to FIG. 4B, in combination with the above case, a case is shown where the received signal quality (e.g., sensitivity level) for the received frame on the medium is lower than the second threshold level Thr2. As the received signal quality is lower than Thr2, the network device keeps the medium assessment as IDLE. Therefore, even in the middle of the frame duration on the medium, the network device decreases the backoff counter value at each slot boundary. When the backoff counter expires, the backoff counter transmits the data frame.

In reference to FIG. 3B, a case is shown that the received signal quality for the frame on the medium is between Thr1 and Thr2, and the COLOR subfield information of the frame on the medium does not match with that of the STA. As the received signal quality is between Thr1 and Thr2, the STA puts the backoff counter on hold while maintaining the channel assessment as IDLE. Therefore, there's no change in the backoff counter until the backoff on hold is released. When the process decodes the preamble part that comprises the COLOR subfield, the network device releases the backoff that was on hold. As the STA identifies that the COLOR subfield does not match with that of the network device and there's no activities that change the channel assessment decision, the network device resumes decreasing the backoff counter from the next slot boundary, which may come even in the middle of the current frame on the medium. And, the network device transmits the data frame when the backoff counter expires. In this case, when the backoff that was on hold is released, the STA decreases the backoff counter value by one at the next slot boundary.

In reference to FIG. 6A, a case is shown that the received signal quality for the frame on the medium is between Thr1 and Thr2, and the COLOR subfield information of the frame on the medium does not match with that of the network device. As the received signal quality is between Thr1 and Thr2, the network device puts the backoff counter on hold while maintaining the channel assessment as IDLE. Therefore, there's no change in backoff counter until the backoff on hold is released. When the network device decodes the preamble part that comprises the COLOR subfield, the network device releases the backoff that was on hold. As the network device identifies that the COLOR subfield does not match with that of the network device and there's no activities that changes the channel assessment decision, the network device resumes decreasing the backoff counter from the next slot boundary, which may come even in the middle of the current frame on the medium. And, the network device transmits the data frame when the backoff counter expires. In this case, when the backoff that was on hold is released, the network device decreases the backoff counter value by greater than or equal to one at the next slot boundary that compensates for the duration that backoff was on hold. In this example, the backoff counter was decreased from 4 to 1.

Referring again to FIG. 3A, a case is shown that the received signal quality for the frame on the medium is between Thr1 and Thr2, and the COLOR subfield information of the frame on the medium matches with that of the network device. As the received signal quality is between Thr1 and Thr2, the network device puts the backoff counter on hold while maintaining the channel assessment as IDLE. Therefore, there's no change in backoff counter until the backoff on hold is released. When the STA decodes the preamble part that comprises the COLOR subfield, the STA releases the backoff that was on hold. As the STA identifies that the COLOR subfield matches with that of the STA and there's activity that changes the channel assessment decision from idle to busy, the STA stops decreasing the backoff counter at least until the channel assessment results becomes idle again. After the ongoing frame is finished and the medium becomes idle, and assuming the STA decoded the payload of the ongoing frame correctly, the network device will start to decrease the backoff counter after waiting for another AIFS time. In this case, the network device decreases the backoff counter value by one at the next slot boundary.

In reference to FIG. 6B, another case is shown that the received signal quality for the frame on the medium is between Thr1 and Thr2, and the COLOR subfield information of the frame on the medium matches with that of the network device. As the received signal quality is between Thr1 and Thr2, the network device puts the backoff counter on hold while maintaining the channel assessment as idle. Therefore, there's no change in backoff counter until the backoff on hold is released. When the network device decodes the preamble part that comprises the COLOR subfield, the network device releases the backoff that was on hold. As the network device identifies that the COLOR subfield matches with that of the network device and there's activity that changes the channel assessment decision from idle to busy, the network device stops decreasing the backoff counter at least until the channel assessment results becomes idle again. After the ongoing frame is finished and the medium becomes idle, and assuming the network device decoded the payload of the ongoing frame correctly, the network will start to decrease the backoff counter after waiting for another AIFS time. In this case, when the backoff that was on hold is released, the network device decreases the backoff counter value by greater than or equal to one at the next slot boundary that compensates for the duration that backoff was on hold. In this example, the backoff counter was decreased from 4 to 1.

Thus the embodiments disclosed herein above have been shown such that they can be implemented in various different ways and combinations, all without departing from the spirit or scope of the present invention.

Figure 7:
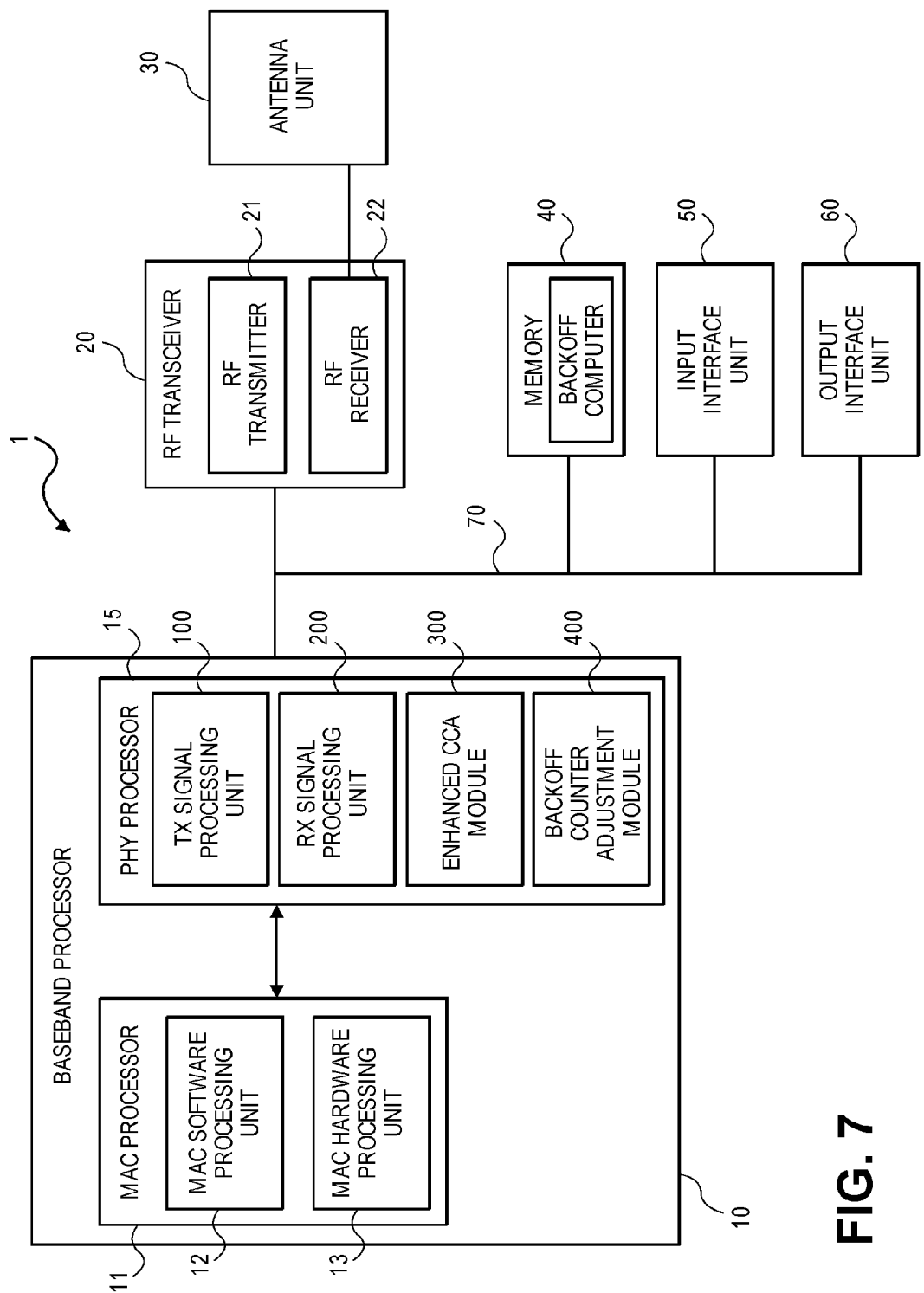
FIG. 7 is a diagram of one embodiment of a network device implementing the adjusted backoff counter process.
Figure 10:
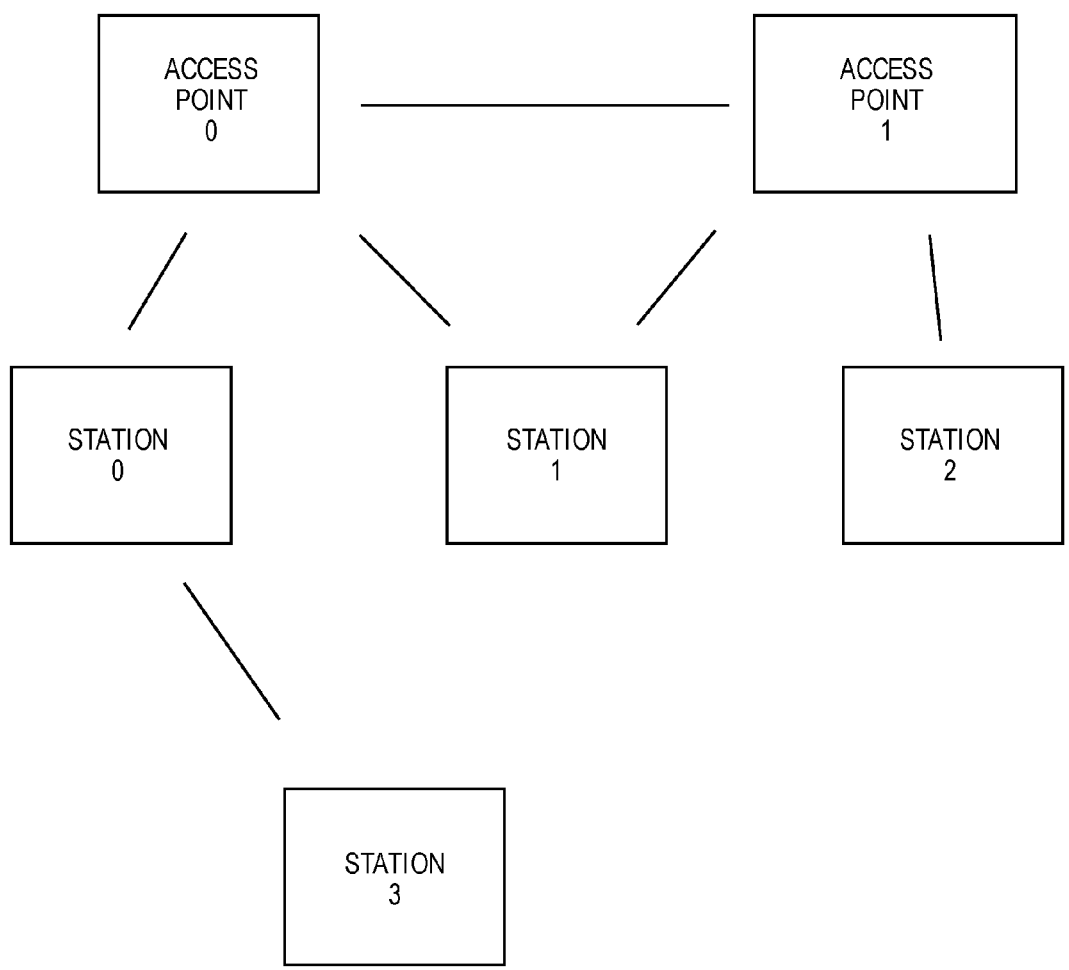
FIG. 10 is a diagram of an example wireless local area network.

FIG. 7 is a diagram of a network device implementing a station or access point that executes a backoff counter adjustment process and module. In a wireless local area network (WLAN) such as the example WLAN illustrated in FIG. 10, a basic service set (BSS) includes a plurality of network devices referred to herein as WLAN devices. Each of the WLAN devices may include a medium access control (MAC) layer and a physical (PHY) layer according to IEEE (Institute of Electrical and Electronics Engineers) 802.11 standard. In the plurality of WLAN devices, at least one WLAN device may be an access point (AP) station (e.g., access point 0 and access point 1 in FIG. 13) and the other WLAN devices may be non-AP stations (non-AP STAs), (e.g., stations 0-3 in FIG. 13). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 10, a WLAN can have any combination of stations and access points that can form a discrete network, an ad hoc network or any combination thereof. Any number of APs and stations can be included in a WLAN and any topology and configuration of such APs and stations in the network can be utilized.

Referring to FIG. 7, the example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC).

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

Figure 11:
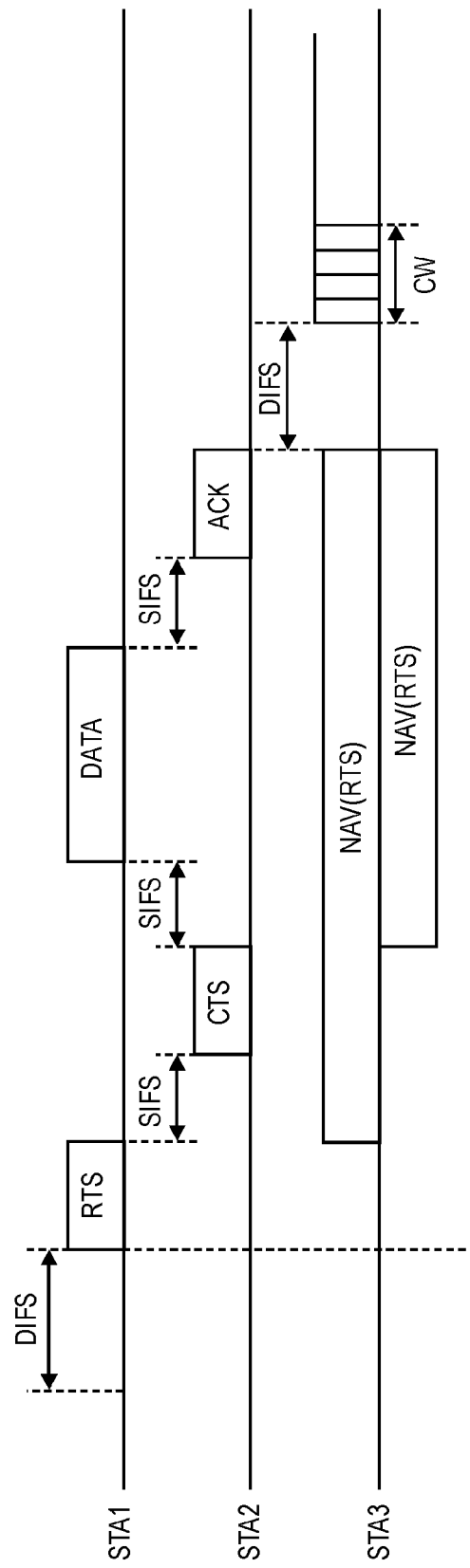
FIG. 11 is a timing diagram providing an example of the carrier sense multiple access/collision avoidance (CSMA/CA) transmission procedure.

The PHY processor 15 includes a transmitting signal processing unit 100 and a receiving signal processing unit 200 described further herein below with reference to FIGS. 11 and 12. In some embodiments, the PHY processor 15 can also implement an enhanced CCA module 300 and/or the backoff counter adjustment module 400. The enhanced CCA module 300 and the backoff counter adjustment module 400 can implement the respective functions for any combination of the embodiments described herein above with regard to FIGS. 1-6B. In other embodiments, these modules may be implemented by or distributed over both the PHY processor 15 and the MAC processor 11. These modules may be implemented as software or as hardware components of either the PHY processor 15 or MAC processor 11. These modules can be implemented as components of the transmitting signal processing unit 100 and the receiving signal processing unit 200 or as discrete components. In a further embodiment, the enhanced CCA module 300 and/or the backoff adjustment module 400 can be implemented by separate components or processors within the baseband processor.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store the nearby stations set. The input interface unit 50 receives information from a user and the output interface unit 60 outputs information to the user.

The antenna unit 30 includes one or more antennas. When a multiple-input multiple-output (MIMO) or a multi-user MIMO (MU-MIMO) system is used, the antenna unit 30 may include a plurality of antennas.

Figure 8:
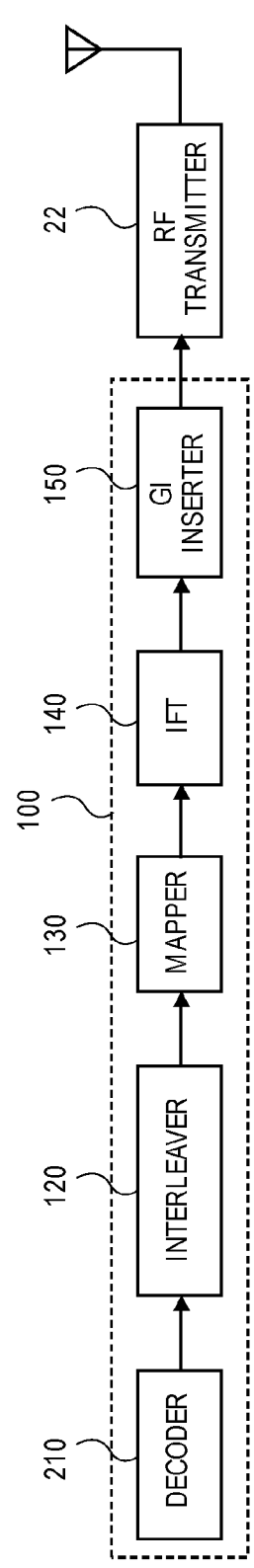
FIG. 8 is a schematic block diagram exemplifying a transmitting signal processor in a WLAN device.

FIG. 8 is a schematic block diagram exemplifying a transmitting signal processor in a WLAN device. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 9:
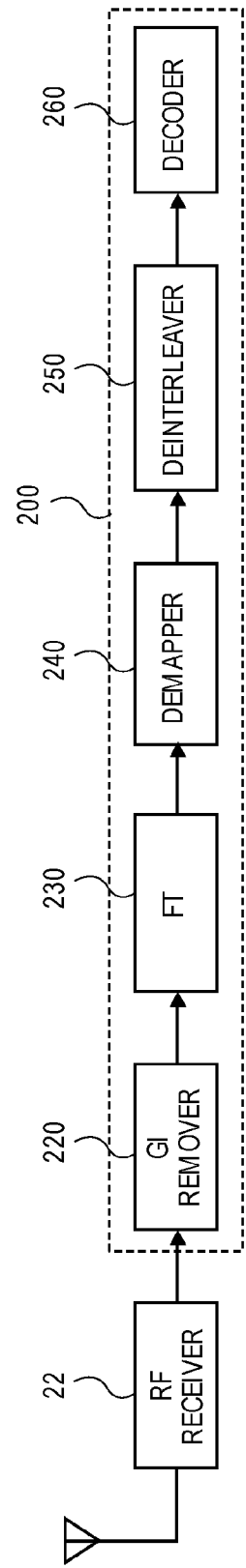
FIG. 9 is a schematic block diagram exemplifying a receiving signal processing unit in the WLAN.

FIG. 9 a schematic block diagram exemplifying a receiving signal processing unit in the WLAN. Referring to FIG. 9, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

A frame as used herein may refer to a data frame, a control frame, or a management frame may be exchanged between WLAN devices. The data frame is used for transmission of data forwarded to a higher layer. The WLAN device transmits the data frame when the wireless medium is considered to be in an idle condition or state such as after performing backoff if a DIFS has elapsed from a time when the medium was not busy or under similar conditions. The management frame is used for exchanging management information, which is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for an associated access category (AC), i.e., AIFS[AC] has elapsed. In this case, the data frame, the management frame, or the control frame, which is not the response frame, may use the AIFS[AC].

As discussed herein CCA and in particular an enhanced CCA module is implemented to manage the transmission of frames by the WLAN device. CCA may implement a CSMA (carrier sense multiple access)/CA (collision avoidance) based frame transmission procedure or similar procedure for avoiding collisions between frames in a channel. The backoff adjustment module is implemented to adjust the backoff counter to take into consideration the complexities of the enhanced CCA module functioning that may require that some decoding of the PHY preamble take place before a decision can be made about the status of the wireless medium FIG. 11 is a timing diagram providing an example of the CSMA/CA transmission procedure. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+ SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

The PHY entity for 802.11 implemented in the WLAN device is based on orthogonal frequency division multiple access OFDM or OFDMA. In either OFDM or OFDMA PHY layers, a STA is capable of transmitting and receiving PPDUs that are compliant with the mandatory PHY specifications. In a PHY specification, set of MCS and maximum number of spatial streams are defined. Also in some PHY entities, downlink and/or uplink MU transmission with a maximum number of space-time streams per user and up to a fix total number of space-time streams is defined.

Figures 12, 13:
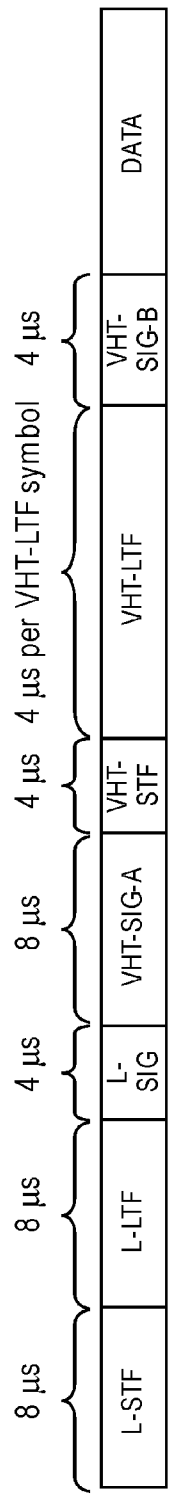
FIG. 12 is a diagram of a very high throughput (VHT) physical layer convergence protocol (PLCP) protocol data unit PPDU utilized by a WLAN device physical layer.
FIG. 13 is a table of the fields of the VHT PPDU.

FIG. 12 is a diagram of a very high throughput (VHT) PPDU utilized by the WLAN device PHY layer. FIG. 13 is a table of the fields of the VHT PPDU. Some PHY entities define PPDU that are individually addressed (where identification is based on AID or Partial AID) and some are group addressed (where identification is based on Group ID, GID). Some PHY entities provide support for 20 MHz, 40 MHz, 80 MHz and 160 MHz contiguous channel widths and support for 80+80 MHz non-contiguous channel width. The data subcarriers are modulated using binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) is used with coding rates of ½, ⅔, ¾ and ⅚.

In each PHY entity, there would be fields denoted as L-SIG, SGI-A, SIG-B where some crucial information about the PSDU attributes are listed. These symbols are usually encoded with the most robust MCS. The L-SIG, SGI-A, SIG-B have very limited number of bits and it is desired to encode them in the most compact form possible. In a receiving STA, first these symbols are decoded in order to obtain vital information about the PSDU attributes and some MAC attributes. In IEE 802.11ac, these symbols are called VHT SIG-A and VHT SIG-B symbols.

As discussed above, WLAN devices are currently being deployed in diverse environments. These environments are characterized by the existence of many access points and non-AP stations in geographically limited areas. Increased interference from neighboring devices gives rise to performance degradation. Additionally WLAN devices are increasingly required to support a variety of applications such as video, cloud access, and offloading. In particular video traffic is expected to be the dominant type of traffic in many high efficiency WLAN deployments. With the real-time requirements of some of these applications, WLAN users demand improved performance in delivering their applications, including improved power consumption for battery-operated devices.

IEEE 802.11ax or HE SIG-A and IEEE 802.11ax or HE SIG-B are referred to simply as simply by SIG-A and SIG-B and are amendments to the 802.11 standard directed at addressing these problems. Unlike previous amendments where the focus was on improving aggregate throughput, this amendment focuses on improving metrics that reflect user experience, such as average per station throughput, the 5th percentile of per station throughput of a group of stations, and area throughput. Improvements will be made to support environments such as wireless corporate office, outdoor hotspot, dense residential apartments, and stadiums.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices. Note the operations of the flowcharts are described with reference to the exemplary embodiments of the diagrams. However, it should be understood that the operations of flowcharts can be performed by embodiments of the invention other than those discussed, and the embodiments of the diagrams can perform operations different than those discussed with reference to the flowcharts.

What is claimed is:

1. A wireless device operating in a wireless network, the wireless device comprising:
   a hardware processor; and
   one or more memories coupled to the hardware processor, wherein the one or more memories include one or more instructions, which when executed by the hardware processor cause the wireless device to:
      detect a wireless medium is idle,
      decrement a backoff counter from a current value in response to detecting the wireless medium is idle, wherein the backoff counter is associated with a clear channel assessment of the wireless medium and the backoff counter was originally set to an initial random value, detect a frame received from a transmitting device over the wireless medium, determine whether the frame is an inter-basic service set (BSS) frame or an intra-BSS frame, during a period of time that the wireless device determines whether the frame is an inter-BSS frame or an intra-BSS frame:

set and maintain a condition for the wireless medium in a busy state, and hold decrementing the backoff counter associated with the clear channel assessment of the wireless medium while determining whether the frame is an inter-BSS frame or an intra-BSS frame, and resume decrementing the backoff counter in response to determining that the frame is an inter-BSS frame relative to the wireless device.

2. The wireless device of claim 1, wherein determining whether the frame is an inter-BSS frame or an intra-BSS frame includes:

comparing a BSS identifier of the wireless device with a BSS identifier of the frame, wherein the frame is determined to be an intra-BSS frame upon detecting a match between the BSS identifier of the wireless device and the BSS identifier of the frame, and wherein the frame is determined to be an inter-BSS frame upon failing to detect a match between the BSS identifier of the wireless device and the BSS identifier of the frame.

3. The wireless device of claim 2, wherein the BSS identifier of the frame is represented in a COLOR field in a physical layer header of the frame.

4. The wireless device of claim 3, wherein the one or more memories include further instructions, which when executed by the hardware processor cause the wireless device to:

determine a signal quality value associated with the frame; and compare the signal quality value of the frame with a first clear channel assessment threshold.

5. The wireless device of claim 4, wherein resuming decrementing the backoff counter is performed in response to determining that the frame is an inter-BSS frame and the signal quality value is below the first clear channel assessment threshold.

6. The wireless device of claim 4, wherein the one or more memories include further instructions, which when executed by the hardware processor cause the wireless device to:

compare the signal quality value of the frame with a second clear channel assessment threshold, wherein the second clear channel assessment threshold is less than the first clear channel assessment threshold, wherein resuming decrementing the backoff counter is performed in response to determining that the frame is an inter-BSS frame and the signal quality value is below the first clear channel assessment threshold and above the second clear channel assessment threshold.

7. The wireless device of claim 4, wherein the signal quality value is a received power level of the frame, and wherein the first clear channel assessment threshold is an overlapping BSS preamble detect (OBSS_PD) threshold.

8. A non-transitory machine readable storage medium having instructions stored therein, which when executed by a processor of a wireless device, cause the wireless device to:

detect a wireless medium is idle, begin decrementing a backoff counter from a current value in response to detecting the wireless medium is idle, wherein the backoff counter is associated with a clear channel assessment of the wireless medium and the backoff counter was originally set to an initial random value, detect a frame received from a transmitting device over the wireless medium, determine whether the frame is an inter-basic service set (BSS) frame or an intra-BSS frame, during a period of time that the wireless device determines whether the frame is an inter-BSS frame or an intra-BSS frame:

set and maintain a condition for the wireless medium in a busy state, and hold decrementing the backoff counter associated with the clear channel assessment of the wireless medium while determining whether the frame is an inter-BSS frame or an intra-BSS frame, and resume decrementing the backoff counter in response to determining that the frame is an inter-BSS frame relative to the wireless device.

9. The non-transitory machine readable storage medium of claim 8, wherein the instructions that cause the wireless device to determine whether the frame is an inter-BSS frame or an intra-BSS frame include instructions that cause the wireless device to:

compare a BSS identifier of the wireless device with a BSS identifier of the frame, wherein the frame is determined to be an intra-BSS frame upon detecting a match between the BSS identifier of the wireless device and the BSS identifier of the frame, and wherein the frame is determined to be an inter-BSS frame upon failing to detect a match between the BSS identifier of the wireless device and the BSS identifier of the frame.

10. The non-transitory machine readable storage medium of claim 9, wherein the BSS identifier of the frame is represented in a COLOR field in a physical layer header of the frame.

11. The non-transitory machine readable storage medium of claim 10, wherein the non-transitory machine readable storage medium includes further instructions, which when executed by the processor cause the wireless device to:

determine a signal quality value associated with the frame; and compare the signal quality value of the frame with a first clear channel assessment threshold.

12. The non-transitory machine readable storage medium of claim 11, wherein resuming decrementing the backoff counter is performed in response to determining that the frame is an inter-BSS frame and the signal quality value is below the first clear channel assessment threshold.

13. The non-transitory machine readable storage medium of claim 11, wherein the non-transitory machine readable storage medium includes further instructions, which when executed by the processor cause the wireless device to:

compare the signal quality value of the frame with a second clear channel assessment threshold, wherein the second clear channel assessment threshold is less than the first clear channel assessment threshold, wherein resuming decrementing the backoff counter is performed in response to determining that the frame is an inter-BSS frame and the signal quality value is below the first clear channel assessment threshold and above the second clear channel assessment threshold.

14. The non-transitory machine readable storage medium of claim 11, wherein the signal quality value is a received power level of the frame.

15. A method for controlling a transmission of a wireless device operating in a wireless network, the method comprising:
   detecting a wireless medium is idle,
   decrementing a backoff counter from a current value in response to detecting the wireless medium is idle, wherein the backoff counter is associated with a clear channel assessment of the wireless medium and the backoff counter was originally set to an initial random value,
   detecting a frame received from a transmitting device over the wireless medium,
   determining whether the frame is an inter-basic service set (BSS) frame or an intra-BSS frame,
   during a period of time that the wireless device determines whether the frame is an inter-BSS frame or an intra-BSS frame:
      setting and maintaining a condition for the wireless medium in a busy state, and
      holding decrementing the backoff counter associated with the clear channel assessment of the wireless medium while determining whether the frame is an inter-BSS frame or an intra-BSS frame, and
   resuming decrementing the backoff counter in response to determining that the frame is an inter-BSS frame relative to the wireless device.

16. The method of claim 15, wherein determining whether the frame is an inter-BSS frame or an intra-BSS frame includes:
   comparing a BSS identifier of the wireless device with a BSS identifier of the frame,
   wherein the frame is determined to be an intra-BSS frame upon detecting a match between the BSS identifier of the wireless device and the BSS identifier of the frame, and
   wherein the frame is determined to be an inter-BSS frame upon failing to detect a match between the BSS identifier of the wireless device and the BSS identifier of the frame.

17. The method of claim 16, wherein the BSS identifier of the frame is represented in a COLOR field in a physical layer header of the frame.

18. The method of claim 17, the method further comprising:
   determining a signal quality value associated with the frame; and
   comparing the signal quality value of the frame with a first clear channel assessment threshold, where the first clear channel assessment threshold is an overlapping BSS preamble detect (OBSS_PD) threshold.

19. The method of claim 18, wherein resuming decrementing the backoff counter is performed in response to determining that the frame is an inter-BSS frame and the signal quality value is below the first clear channel assessment threshold.

20. The method of claim 18, the method further comprising:
   compare the signal quality value of the frame with a second clear channel assessment threshold, wherein the second clear channel assessment threshold is less than the first clear channel assessment threshold,
   wherein resuming decrementing the backoff counter is performed in response to determining that the frame is an inter-BSS frame and the signal quality value is below the first clear channel assessment threshold and above the second clear channel assessment threshold.

* * * * *